Patented Apr. 3, 1923.

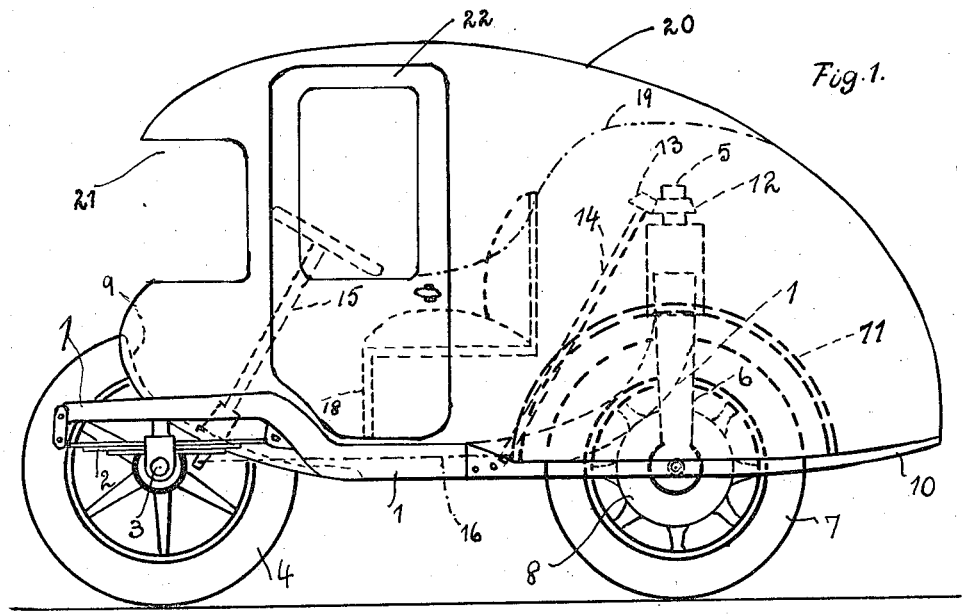
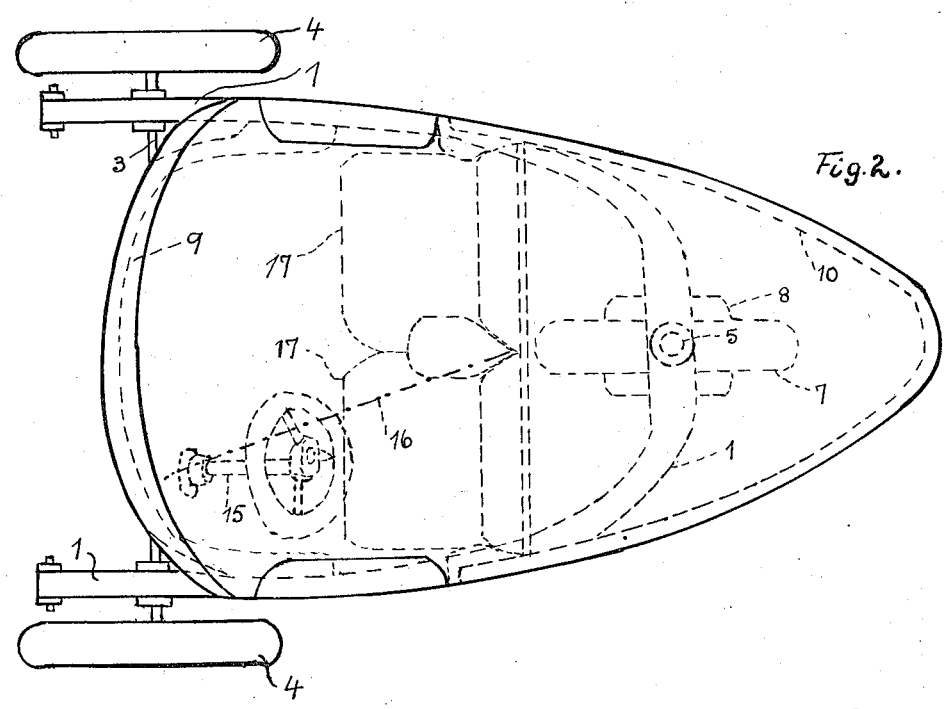

1,450,622

UNITED STATES PATENT OFFICE.

ERWIN WESNIGK, OF BERLIN, GERMANY.

THREE-WHEELED AUTOMOBILE.

Application filed January 17, 1922. Serial No. 529,980.

*To all whom it may concern:*

Be it known that I, ERWIN WESNIGK, of Berlin, Germany, have invented certain new and useful Improvements in Three-Wheeled Automobiles, for which I have filed an application in Germany, dated 29th April, 1920, and of which the following is a specification.

The essence of the invention consists in the construction of a passenger car with two fore wheels and a driving hind wheel in such manner that there is obtained a body with a broad fore part and a sharp or pointed hind part, the seats being arranged in the broad fore part and the motor and its accessories in the pointed hind part. Accordingly the whole body of the car receives a drop form or stream line form, the special advantage of which form is that it produces a specially small air resistance and thereby the car is made to run at very high speed without any obstruction. Furthermore the centre of gravity of passengers sitting in the car lies considerably near to the driven hind wheel so that this is loaded proportionately to the useful load of the car, whereby a very sure handling of the car without any danger of slipping of the wheel is attained.

A further feature of the invention consists therein that the hind wheel is not only constructed as driving wheel but also as governed wheel and that the horizontal shape of the frame and the body at the sides is confined by circular faces the centres of which lie on elongations of the fore axle at such a distance from the middle plane of the car, that they furnish the centres of the shortest curves which the car shall run. The driving gear hereby becomes specially simple and nevertheless in consequence of the broad fore part and the pointed hind part of the car, even the employment of a governed hind wheel causes no danger to bystanding persons or other objects while going in a curve.

Further objects of the invention are hereafter more clearly explained while describing in detail the many parts belonging to the invention.

The drawings show an example of the invention in the form of a small electrically driven car for two passengers.

Fig. 1 is a side view, the left front wheel being dismantled for the sake of clearness.

Fig. 2 is an upper view.

The fundamental frame 1 of U shaped upper view carries at its fore part by leaf springs 2 a fore axle 3 on which the fore wheels 4 are rotatably mounted. At the upwardly bent hind part of this frame a fork 6 supporting the hind wheel 7 is turnably mounted by a steering tube 5. The hind wheel 7 contains an electro motor 8 arranged in known manner so that the motor immediately moves the hind wheel. Hereby it is possible to drive the hind wheel and to steer it at the same time so that neither driving nor steering of the two fore wheels is necessary, but all is accomplished in the simplest manner by the one hind wheel. The main frame 1 contains in its fore part a cross girder 9 shaped so as to fit to the upwardly curved fore part of the car bottom. At the hind part an additional frame 10 is attached which in similar way serves as a support for the hind part of the body. The bottom of the car is formed as a ball like part 11 above the hind wheel 7, and in its other part it is confined by the outline of the frame.

For steering the car, on the steering shaft 5, a conical toothed wheel 12 is mounted, which wheel meshes with a second conical wheel 13, the latter being fixed on an intermediate shaft 14, which extends forwardly and downwardly and is held in bearings not shown in the drawing. In the fore part at the bottom of the car a steering post 15 is fitted which with the said intermediate shaft 14 is coupled by a gear which is only shown by a dash and dotted line 16. The intermediate gear may be constructed as a connecting rod attached by levers to the both parts 14 and 15 or it may be constructed as a rotatable shaft connected with the both said parts by toothed gears.

The intermediate shaft 14 and the steering post 15 are parallel to each other so that for instance the intermediate gear 16 may be a simple connecting rod and two levers connecting the said rod to the said parts 14 and 15. This arrangement includes the reversion of movements, which is necessary for the steering of the hind wheel in comparison with steering the fore wheels as in normal cars, the pair of conical wheels 12, 13 giving the effect that a turning to the right of the steering post 15 causes the car to make a curve to the right and an opposite movement of the steering post makes the car run in the opposite curve direction.

The main frame 1 in connection with the hind additional frame 10 has such an outline that the both sides of the car are formed by circles, the centres of which lie at elongations of the fore axle and the diameters of which correspond to the diameters of the shortest curve to be run in normal driving. Thereby it is impossible that objects standing besides the car could ever be hurt by the hind part of the car while making a curve.

The body may be opened in its upper part so that it contains the seats 17 and the accumulator box 18 arranged therein and forms a further envelope for the hind part containing the steered wheel and the driving gear, which envelope is shown by the dash and dotted line 19. Hereby at once a wind protector for the persons sitting in the car is given, the air flowing only very slowly in the part lying in the front of this envelope 19; moreover a good drop-like form is obtained which is essential for giving the least possible air resistance as known in flying machine practice. In the form shown in the drawing a fully closed body 20, with a window 21, in its fore part and with inlet doors 22 is used; below the inlet doors 22 steps may be arranged in the usual manner for facilitating the entrance.

Having now fully described and ascertained the nature of my said invention, what I claim and desire to secure by Letters Patent of the United States is:

1. A three wheeled automobile comprising, in combination, two fore wheels; a hind wheel; a body of stream line or drop form, having its broader part forward and its narrow pointed part at the rear; a seat arranged in the broad fore part of the body; and a motor driving the automobile, said motor, its accessories, and the hind wheel being disposed within and below the pointed rear part of said body.

2. A three wheeled automobile comprising, in combination, two fore wheels; a rear steering wheel; and a body of general stream line or drop form enveloping the rear steering wheel, said body being limited on both sides by circular faces the centers of which are located on prolongations of the front axle in the centers of the shortest curves which the automobile is adapted to describe.

3. A three wheeled automobile fitted with two fore wheels, a steered hind wheel and a body having a stream line or drop form enveloping the hind wheel, and a shaft fitted to the fork of the steered hind wheel, a conical toothed wheel on the said shaft, which wheel meshes with a second conical wheel fixed on to an intermediate shaft extending in a downward and forward direction, an intermediate gear and a steering post in the fore part of the car, which steering post is essentially parallel to the said intermediate shaft.

4. In a three wheeled automobile, in combination, two front wheels; a rear wheel; a stream line body having its widest part forward, and its narrowest part at the rear; a motor mounted on the rear wheel to drive the same, and a seat within said body intermediate the front and rear wheels, whereby the tendency to skid or overturn is diminished.

In witness whereof I affix my signature.

ERWIN WESNIGK.

Witnesses:
   JOSEPH VIOTEGGI-NEVINS,
   F. ABOUL QUDERS.